US009939652B2

(12) United States Patent
Park et al.

(10) Patent No.: US 9,939,652 B2
(45) Date of Patent: Apr. 10, 2018

(54) DISPLAY DEVICES AND IMAGE CREATING METHODS FOR LAYERED DISPLAY TECHNOLOGIES

(71) Applicant: Samsung Electronics Co., Ltd., Suwon-Si, Gyeonggi-Do (KR)

(72) Inventors: Ju Yong Park, Seongnam-si (KR); Jae Hyeung Park, Gunpo-si (KR); Na Young Jo, Incheon (KR); Dong-kyung Nam, Yongin-si (KR); Seok Lee, Hwaseong-si (KR)

(73) Assignees: Samsung Electronics Co., Ltd., Gyeonggi-do (KR); Inha-Industry Partnership Institute, Incheon (KR)

( * ) Notice: Subject to any disclaimer, the term of this patent is extended or adjusted under 35 U.S.C. 154(b) by 72 days.

(21) Appl. No.: 14/454,160

(22) Filed: Aug. 7, 2014

(65) Prior Publication Data
US 2015/0138200 A1 May 21, 2015

(30) Foreign Application Priority Data

Nov. 19, 2013 (KR) .................. 10-2013-0140511

(51) Int. Cl.
G06T 15/50 (2011.01)
G02B 27/22 (2006.01)
G02B 27/26 (2006.01)
H04N 13/00 (2018.01)
H04N 13/04 (2006.01)

(52) U.S. Cl.
CPC ......... G02B 27/26 (2013.01); H04N 13/0007 (2013.01); H04N 13/0402 (2013.01); H04N 13/0422 (2013.01); H04N 13/0484 (2013.01)

(58) Field of Classification Search
CPC ...... G06T 15/506; G02B 27/2214; G02F 1/03
USPC .............................. 345/426; 349/15; 359/251
See application file for complete search history.

(56) References Cited

U.S. PATENT DOCUMENTS

| 5,940,149 | A | 8/1999 | Vanderwerf |
| 6,181,400 | B1 | 1/2001 | Yang et al. |
| 6,580,471 | B2 | 6/2003 | Knox |
| 6,867,836 | B2 | 3/2005 | Stalder et al. |
| 6,999,155 | B2 | 2/2006 | Tillin et al. |
| 7,339,735 | B2 | 3/2008 | Li |
| 7,705,935 | B2 | 4/2010 | Gaudreau |
| 7,710,669 | B2 | 5/2010 | Li |
| 7,843,529 | B2 | 11/2010 | Ikeno et al. |

(Continued)

FOREIGN PATENT DOCUMENTS

| KR | 20060052585 A | 5/2006 |
| KR | 20110118503 A | 10/2011 |
| KR | 20130088848 A | 8/2013 |

Primary Examiner — Zhengxi Liu
Assistant Examiner — Yi Yang
(74) Attorney, Agent, or Firm — Harness, Dickey & Pierce, P.L.C.

(57) ABSTRACT

A display device may include: a plurality of layers configured to modulate pixel values in two directions; an obtaining unit configured to obtain matching information about matching of pixels belonging to differing layers; and/or a controller configured to control the plurality of layers based on the matching information. An image creating method may include: obtaining a target light field; obtaining a projection matrix corresponding to a viewpoint of a user; and/or creating a plurality of layer images for a plurality of layers configured to modulate pixel values in two directions based on the target light field and the projection matrix.

20 Claims, 13 Drawing Sheets

(56) References Cited

U.S. PATENT DOCUMENTS

| | | | | |
|---|---|---|---|---|
| 2003/0076919 A1* | 4/2003 | Suzuki | A61B 6/032 | 378/4 |
| 2005/0146787 A1* | 7/2005 | Lukyanitsa | G02B 27/2214 | 359/462 |
| 2007/0001956 A1* | 1/2007 | Yeh | G09G 3/3233 | 345/92 |
| 2008/0068314 A1* | 3/2008 | Hsieh | G02F 1/133371 | 345/87 |
| 2008/0226123 A1* | 9/2008 | Birtwistle | G06T 11/001 | 382/100 |
| 2008/0246897 A1* | 10/2008 | Gaudreau | G02B 27/26 | 349/15 |
| 2010/0007577 A1* | 1/2010 | Ninan | H04N 9/3102 | 345/1.3 |
| 2010/0046071 A1* | 2/2010 | Nishimura | G02B 5/3083 | 359/485.01 |
| 2011/0093778 A1* | 4/2011 | Kim | G06F 3/041 | 715/702 |
| 2011/0109750 A1* | 5/2011 | Du | G01S 7/4814 | 348/180 |
| 2012/0050562 A1* | 3/2012 | Perwass | H04N 13/0232 | 348/222.1 |
| 2012/0140131 A1 | 6/2012 | Lanman et al. | | |
| 2012/0236219 A1 | 9/2012 | Kroll et al. | | |
| 2013/0113701 A1* | 5/2013 | Sasaki | G06T 19/00 | 345/156 |

* cited by examiner

DISPLAY DEVICES AND IMAGE CREATING METHODS FOR LAYERED DISPLAY TECHNOLOGIES

CROSS-REFERENCE TO RELATED APPLICATION(S)

This application claims priority from Korean Patent Application No. 10-2013-0140511, filed on Nov. 19, 2013, in the Korean Intellectual Property Office (KIPO), the entire contents of which are incorporated herein by reference.

BACKGROUND

1. Field

Some example embodiments relate to display devices for display of stereoscopic images. Some example embodiments relate to image creating methods for display of stereoscopic images.

2. Description of Related Art

A dominant factor contributing to recognizing a stereoscopic image is a difference in an image viewed by both eyes of a user. A method of displaying differing images to both eyes of a user may be classified into a glasses-type, method in which a desired image is filtered based on polarization division, time division, and/or wavelength division based on differing wavelengths of primary colors, and an auto-stereoscopic method, in which a plurality of images is viewed in a predetermined space using a parallax barrier or a lenticular lens.

The auto-stereoscopic method has an advantage in mitigating the inconvenience of wearing glasses. However, it also has disadvantages in that a large number of viewpoints may be required to expand a viewing area, image quality may be degraded by crosstalk between viewpoints, and image quality may be significantly deteriorated when deviating from a fixed optimum viewing distance.

SUMMARY

In some example embodiments, a display device may comprise: a plurality of layers configured to modulate pixel values in two directions; an obtaining unit configured to obtain matching information about matching of pixels belonging to differing layers; and/or a controller configured to control the plurality of layers based on the matching information.

In some example embodiments, the plurality of layers may comprise: at least one layer configured to modulate a polarization rotation clockwise and counter-clockwise.

In some example embodiments, the plurality of layers may comprise: at least one layer configured to modulate a polarization rotation within 180 degrees.

In some example embodiments, the display device may further comprise: a first polarizing filter on a rear side of a rearmost layer from among the plurality of layers; and/or a second polarizing filter on a front side of a forefront layer from among the plurality of layers. The first polarizing filter and the second polarizing filter may be configured to have polarization directions perpendicular to each other. The plurality of layers may be configured to modulate a polarization rotation of light that passes through the first polarizing filter or a previous layer in the two directions.

In some example embodiments, the plurality of layers may comprise at least one of: a twisted nematic (TN) panel having a phase retardation in integer multiples of 360 degrees; and an in-plane switching (IPS) panel having a phase retardation in odd multiples of 180 degrees.

In some example embodiments, the plurality of layers may comprise: at least one layer comprising a single macro pixel comprising a self-emitting pixel and an attenuation pixel.

In some example embodiments, the plurality of layers may comprise: at least one layer comprising a self-emitting layer and an attenuation layer.

In some example embodiments, the matching information may be generated by selecting at least one pixel from among the plurality of layers.

In some example embodiments, the display device may further comprise: a receiver configured to receive a position of an eye of a user. The matching information may be generated based on the position of the eye of the user.

In some example embodiments, the matching information may comprise: first matching information about matching of pixels on a first path of light generated by a light-emitter reaching a left eye of a user; and/or second matching information about matching of pixels on a second path of the light reaching a right eye of the user.

In some example embodiments, the controller may be further configured to determine a plurality of pixel values for the plurality of layers based on a target light field and the matching information.

In some example embodiments, when pixel values of layers remaining subsequent to excluding one of the plurality of layers are determined with respect to a ray that passes through the plurality of layers, a pixel value of the excluded layer may exist that represents a final pixel value of the ray through a combination of the determined pixel values.

In some example embodiments, the controller may be further configured to detect a ray yet to be processed, that passes through a pixel currently being processed, from among a plurality of rays that passes through the plurality of layers. The controller may be further configured to detect a pixel yet to be processed through which the detected ray passes. The controller may be further configured to calculate a pixel value of the pixel yet to be processed based on a pixel value of the pixel currently being processed.

In some example embodiments, the controller may be further configured to control the plurality of layers to display differing images at a position of a left eye of a user and a position of a right eye of the user.

In some example embodiments, an image creating method may comprise: obtaining a target light field; obtaining a projection matrix corresponding to a viewpoint of a user; and/or creating a plurality of layer images for a plurality of layers configured to modulate pixel values in two directions based on the target light field and the projection matrix.

In some example embodiments, when a number of pixels comprised in each of the plurality of layers corresponds to "n", "n" being a positive integer, the target light field may comprise "n" number of rays for a left eye of a user and "n" number of rays for a right eye of the user.

In some example embodiments, when a number of rays comprised in the target light field corresponds to "N", "N" being a positive integer, and a number of pixels included in the plurality of layers corresponds to "M", "M" being a positive integer, the projection matrix may be provided in a size of "N×M".

In some example embodiments, the plurality of layers may be further configured to control a polarization rotation of light clockwise and counter-clockwise.

In some example embodiments, the plurality of layers may be further configured to control an attenuation of light in a direction in which brightness of a transmitted light increases and in a direction in which brightness of a transmitted light decreases.

In some example embodiments, a non-transitory computer-readable medium may comprise a program for instructing a computer to perform an image creating method. The creating method may comprise: obtaining a target light field; obtaining a projection matrix corresponding to a viewpoint of a user; and/or creating a plurality of layer images for a plurality of layers configured to modulate pixel values in two directions based on the target light field and the projection matrix.

BRIEF DESCRIPTION OF THE DRAWINGS

The above and/or other aspects and advantages will become more apparent and more readily appreciated from the following detailed description of example embodiments, taken in conjunction with the accompanying drawings, in which.

DETAILED DESCRIPTION

Figure 1:
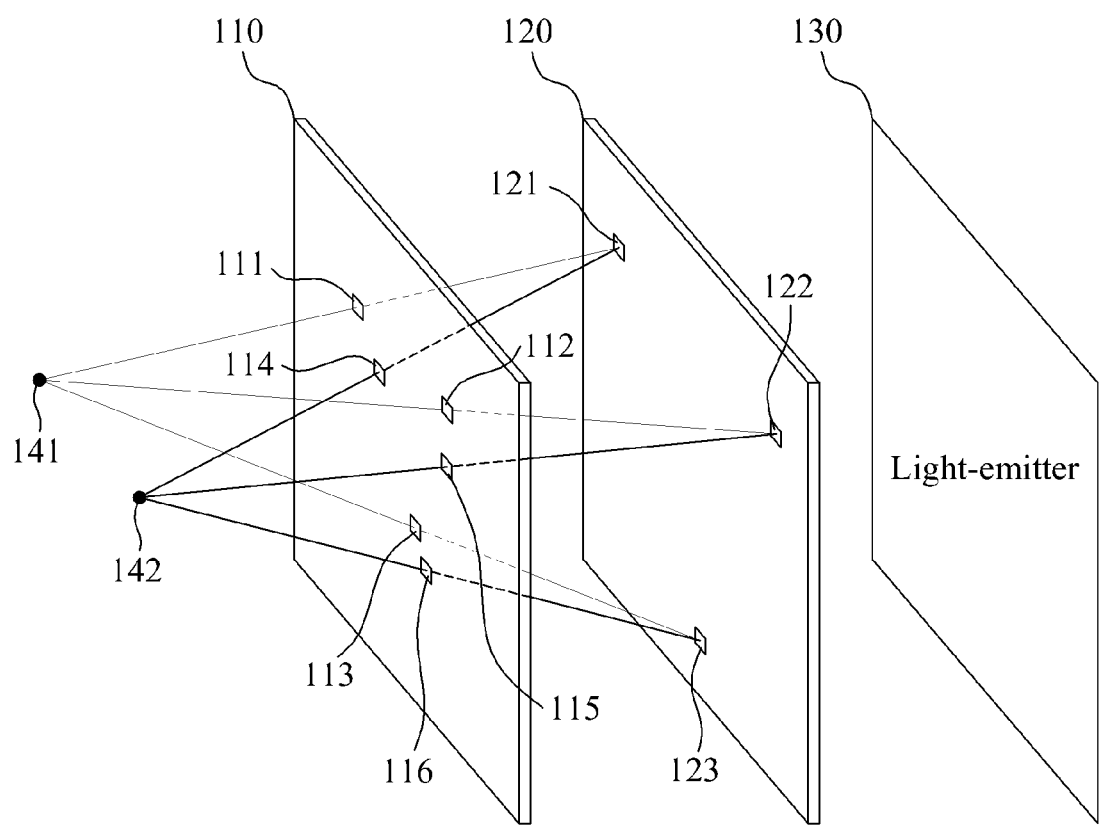
FIG. 1 illustrates a display device to display a stereoscopic image according to some example embodiments.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Example embodiments may be described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will typically have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature, their shapes are not intended to illustrate the actual shape of a region of a device, and their shapes are not intended to limit the scope of the example embodiments.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

Overview of Layered Display Device According to Some Example Embodiments

FIG. 1 illustrates a display device to display a stereoscopic image according to some example embodiments. Referring to FIG. 1, the display device includes a plurality of layers 110 and 120. The display device displays a stereoscopic image by allowing a light recognized by a left eye 141 of a user to differ from a light recognized by a right eye 142 of the user using the plurality of layers 110 and 120. Hereinafter, a method in which the display device displays the stereoscopic image using the plurality of layers 110 and 120 will be described.

The plurality of layers 110 and 120 may include display panels in various methods. For example, the plurality of layers 110 and 120 includes display panels that control a transmittance of a passing light. The display panels represent a color by controlling the transmittance of the passing light. A light generated by a light-emitter 130 is a white light including all of a red (R) property, a green (G) property, and a blue (B) property. The display panels control each of a transmittance of the R property, a transmittance of the G property, and a transmittance of the B property. The display panels include a plurality of pixels, and control a transmittance of an R property, a transmittance of a G property, and a transmittance of a B property of a light that passes through each of the plurality of pixels. Each of the plurality of pixels includes an R sub-pixel to control the transmittance of the R property, a G sub-pixel to control the transmittance of the G property, and a B sub-pixel to control the transmittance of the B property. Each of the plurality of pixels represents a white light through a combination of the transmittance of the R property, the transmittance of the G property, and the transmittance of the B property. However, the plurality of pixels may further include a white (W) sub-pixel to control a transmittance of a W property, depending on a particular case.

A path of a light reaching the left eye 141 of the user differs from a path of a light reaching the right eye 142 of the user because the left eye 141 and the right eye 142 of the user are spaced apart from each other. For example, a light that passes through a pixel 121 included in the first layer 120 passes through a pixel 111 included in the second layer 110 to reach the left eye 141 of the user. The light that passes through the pixel 121 included in the first layer 120 passes through a pixel 114 included in the second layer 110 to reach the right eye 142 of the user. In this example, the light recognized by the left eye 141 of the user is determined by a combination of a transmittance of the pixel 121 included in the first layer 120 and a transmittance of the pixel 111 included in the second layer 110. The light recognized by the right eye 142 of the user is determined by a combination of the transmittance of the pixel 121 included in the first layer 120 and the transmittance of the pixel 114 included in the second layer 110.

The display device controls the pixel 121 included in the first layer 120, the pixel 111 included in the second layer 110, and the pixel 114 included in the second layer 110 to display differing images on the left eye 141 and on the right eye 142 of the user. For example, the display device controls a transmittance of an R property to be "0.9", a transmittance of a G property to be "0.6", and a transmittance of a B property to be "0.5" in the pixel 121 included in the first layer 120. Also, the display device controls a transmittance of an R property to be "0.1", a transmittance of a G property to be "0.5", and a transmittance of a B property to be "0.8" in the pixel 111 included in the second layer 110, and controls a transmittance of an R property to be "0.9", a transmittance of a G property to be "0.1", and a transmittance of a B property to be "0.5" in the pixel 114 included in the second layer 110. In this example, the light reaching the left eye 141 of the user passes through the pixel 121 included in the first layer 120 and the pixel 111 included in the second layer 110. Accordingly, a color of the light is determined by the transmittance of the pixel 121 included in the first layer 120 and the transmittance of the pixel 111 included in the second layer 110.

For example, the color of the light reaching the left eye 141 of the user is determined by a combination of the transmittances of the R property, a combination of the transmittances of the G property, and a combination of the transmittances of the B property for each of the pixels 121 and 111 disposed on the same path. Here, the combination of the transmittances is calculated by multiplying the transmittances. By way of example, the R property of the light reaching the left eye 141 of the user is represented as "0.09" obtained by multiplying the transmittance of the R property of the pixel 121, for example, "0.9", and the transmittance of the R property of the pixel 111, for example, "0.1". The G property of the light reaching the left eye 141 of the user is represented as "0.30" obtained by multiplying the transmittance of the G property of the pixel 121, for example, "0.6", and the transmittance of the G property of the pixel 111, for example, "0.5". The B property of the light reaching the left eye 141 of the user is represented as "0.40" obtained by multiplying the transmittance of the B property of the pixel 121, for example, "0.5", and the transmittance of the B property of the pixel 111, for example, "0.8".

In a similar manner, the light reaching the right eye 142 of the user is determined by a combination of the transmittances of the R property, the transmittances of the G property, and the transmittances of the B property for each of the pixels 121 and 114 disposed on the same path because the light passes through the pixel 121 included in the first layer 120 and the pixel 114 included in the second layer 110. Here, the combination of the transmittances is calculated by multiplying the transmittances. By way of example, the R property of the light reaching the right eye 142 of the user is represented as "0.81" obtained by multiplying the transmittance of the R property of the pixel 121, for example, "0.9", and the transmittance of the R property of the pixel 114, for example, "0.9". The G property of the light reaching the right eye 142 of the user is represented as "0.06" obtained by multiplying the transmittance of the G property of the pixel 121, for example, "0.6", and the transmittance of the G property of the pixel 114, for example, "0.1". The B property of the light reaching the right eye 142 of the user is represented as "0.25" obtained by multiplying the transmittance of the B property of the pixel 121, for example, "0.5", and the transmittance of the B property of the pixel 114, for example, "0.5".

The display device may provide a stereoscopic image to a user using a difference in lights reaching both eyes of the user because a light of which a transmittance of a red, green, blue (RGB) property is (0.09, 0.30, 0.40) reaches the left eye 141 and a light of which a transmittance of an RGB property is (0.81, 0.06, 0.25) reaches the right eye 142.

According to another embodiment, the plurality of layers 110 and 120 includes display panels that control a polarization rotation of a passing light. The display panels control the polarization rotation of the passing light to express a color. The display panels control a polarization rotation of an R property, a polarization rotation of a G property, and a polarization rotation of a B property. The display panels include a plurality of pixels, and control a polarization rotation of an R property, a polarization rotation of a G property, and a polarization rotation of a B property of a light that passes through each of the plurality of pixels. The plurality of pixels includes an R sub-pixel to control the polarization rotation of the R property, a G sub-pixel to control the polarization rotation of the G property, and a B sub-pixel to control the polarization rotation of the B property. Each of the plurality of pixels represents a white light through a combination of the polarization rotation of the R property, the polarization rotation of the G property, and the polarization rotation of the B property. However, the plurality of pixels may further include a W sub-pixel to control a polarization rotation of a W property, depending on a particular case.

The path of the light reaching the left eye 141 of the user differs from the path of the light reaching the right eye 142 of the user because the left eye 141 and the right eye 142 of the user are spaced apart from each other. For example, the light that passes through the pixel 121 included in the first layer 120 passes through the pixel 111 included in the second layer 110 to reach the left eye 141 of the user. The light that passes through the pixel 121 included in the first layer 120 passes through the pixel 114 included in the second layer 110 to reach the right eye 142 of the user. In this example, the light recognized by the left eye 141 is determined by a combination of a polarization rotation of the pixel 121 included in the first layer 120 and a polarization rotation of the pixel 111 included in the second layer 110. The light recognized by the right eye 142 is determined by a combination of the polarization rotation of the pixel 121 included in the first layer 120 and the polarization rotation of the pixel 114 included in the second layer 110.

The display device controls the pixel 121 included in the first layer 120, the pixel 111 included in the second layer 110, and the pixel 114 included in the second layer 110 to display differing images on the left eye 141 and on the right eye 142 of the user. For example, the display device controls a polarization rotation of an R property to be 80 degrees, a polarization rotation of a G property to be 45 degrees, and a polarization rotation of a B property to be 30 degrees of the pixel 121 included in the first layer 120. Also, the display device controls a polarization rotation of an R property to be 5 degrees, a polarization rotation of a G property to be 15 degrees, and a polarization rotation of a B property to be 30 degrees of the pixel 111 included in the second layer 110, and controls a polarization rotation of an R property to be 10 degrees, a polarization rotation of a G property to be 5 degrees, and a polarization rotation of a B property to be 50 degrees of the pixel 114 included in the second layer 110. In this example, the light reaching the left eye 141 of the user passes through the pixel 121 included in the first layer 120 and the pixel 111 included in the second layer 110. Accordingly, a color of the light is determined by the polarization rotation of the pixel 121 included in the first layer 120 and the polarization rotation of the pixel 111 included in the second layer 110.

For example, the color of the light reaching the left eye 141 of the user is determined by a combination of the polarization rotations of the R property, a combination of the polarization rotations of the G property, and a combination of the polarization rotations of the B property for each of the pixels 121 and 111 disposed on the same path. Here, the combination of the polarization rotations is obtained by calculating a sum of the polarization rotations. By way of example, the R property of the light reaching the left eye 141 of the user is represented as 85 degrees obtained by calculating the sum of the polarization rotation of the R property of the pixel 121, for example, 80 degrees, and the polarization rotation of the R property of the pixel 111, for example, 5 degrees. The G property of the light reaching the left eye 141 of the user is represented as 60 degrees obtained by calculating the sum of the polarization rotation of the G property of the pixel 121, for example, 45 degrees, and the polarization of the G property of the pixel 111, for example, 15 degrees. The B property of the light reaching the left eye 141 of the user is represented as 60 degrees obtained by calculating the sum of the polarization rotation of the B property of the pixel 121, for example, 30 degrees, and the polarization rotation of the B property of the pixel 111, for example, 30 degrees.

In a similar manner, the light reaching the right eye 142 of the user is determined by a combination of the polarization rotations of the R property, a combination of the polarization rotations of the G property, and a combination of the polarization rotations of the B property for each of the pixels 121 and 114 disposed on the same path because the light passes through the pixel 121 included in the first layer 120 and the pixel 114 included in the second layer 110. Here, the combination of the polarization rotations is obtained by calculating a sum of the polarization rotations. By way of example, the R property of the light reaching the right eye 142 of the user is represented as 90 degrees obtained by calculating a sum of the polarization rotation of the R property of the pixel 121, for example, 80 degrees, and the polarization rotation of the R property of the pixel 114, for example, 10 degrees. The G property of the light reaching the right eye 142 of the user is represented as 50 degrees obtained by calculating a sum of the polarization rotation of the G property of the pixel 121, for example, 45 degrees, and the polarization rotation of the G property of the pixel 114, for example, 5 degrees. The B property of the light reaching the right eye 142 of the user is represented as 80 degrees obtained by calculating a sum of the polarization rotation of the B property of the pixel 121, for example, 30 degrees, and the polarization rotation of the B property of the pixel 114, for example, 50 degrees.

The display device may provide a stereoscopic image to the user using a difference in lights reaching both eyes of the user because a light of which a polarization rotation of an RGB property is (85 degrees, 60 degrees, 60 degrees) reaches the left eye 141 and a light of which a polarization rotation of an RGB property is (90 degrees, 50 degrees, 80 degrees) reaches the right eye 142.

The display device displays a stereoscopic image by controlling images represented in the plurality of layers 110 and 120. Hereinafter, the images represented in the plurality of layers 110 and 120 are referred to as "layer images". A first layer image for the first layer 120 includes information about controlling a plurality of pixels 121, 122, and 123 included in the first layer 120. For example, the first layer image includes information about controlling transmittances or polarization rotations for the plurality of pixels 121, 122, and 123 included in the first layer 120. Also, a second layer image for the second layer 110 includes information about controlling a plurality of pixels 111, 112, 113, 114, 115, and 116 included in the second layer 110. For example, the second layer image includes information about controlling transmittances or polarization rotations for the plurality of pixels 111, 112, 113, 114, 115, and 116 included in the second layer 110.

The display device according to some example embodiments may provide a technology for viewing images differing based on positions of both eyes using a plurality of display panels. For example, in a layered display structure, differing rays configuring a light field transmit differing sub-pixel combinations of panels included in a layered display. Accordingly, a light field corresponding to a stereoscopic image is reproduced by appropriately setting transmittances of a plurality of sub-pixels.

Reproducing a light field using a highly variable unit, for example, a laminated panel, is most characteristic of the layered display. For example, conventional auto-stereoscopic three-dimensional (3D) display methods apply directivities to pixels in a two-dimensional (2D) array on a panel, irrespective of a 3D image to be represented. In this example, the conventional auto-stereoscopic 3D display methods apply directivities in predetermined directions to the pixels in the 2D array of the panel using an optic system in a fixed structure, such as a parallax barrier or a lenticular lens. However, the layered display reproduces a light field by adaptively forming a pixel pattern within a laminated panel based on a 3D image to be represented. Accordingly, the layered display may be relieved from conventional restraints imposed by degradation of resolution in proportion to a number of viewpoints and a number of directions of lights. The layered display represents a 3D image maintaining a resolution of an outermost or uppermost panel.

Although not shown in the drawings, the display device may provide a stereoscopic image to a user using at least three layers. The display device creates layer images that control at least three layers.

Conventionally, a number of rays configuring a light field to be reproduced in a layered display are significantly greater than a number of all pixels within a laminated panel. The number of rays being much greater than the number of all pixels indicates that a number of equations to satisfy outnumber a number of controllable unknown quantities. In this instance, obtaining an accurate solution may be impossible or difficult. The display device reduces complexity of a calculation of creating a layer image based on information about an eye position of a user. The display device receives the information about the eye position of the user from a sensor to track the eye position of the user, and creates the layer image based on the received information. In this example, a size of a service area to provide a stereoscopic image may be diminished to an area tracked to be the eye position of the user. The complexity of the calculation of creating the layer images may decrease because the display device displays the stereoscopic image with respect to the area tracked to be the eye position of the user. The display device may provide a technology for creating a stereoscopic image in a high resolution while requiring a small amount of calculation.

In general, a panel of the layered display has a confined range of a pixel value representable on the panel. For example, a panel of the conventional layered display employs a liquid crystal (LC), and appropriately attenuates brightness of a ray delivered from a previous layer. The panel of the conventional layered display may not increase brightness of a ray, hence a limited range of a sub-pixel value. Examples in which pixels of a laminated panel change a polarization of a ray in a predetermined angle rather than attenuate brightness of a ray may be provided, however, have similar restrictions to an operation in the aforementioned attenuation mode because a range of a polarization angle to be modulated by each panel pixel is 90 degrees at a maximum. Due to such restrictions, the conventional layered display may not obtain a solution of pixel values used to accurately reproduce a target light field. Alternatively, the conventional layered display operates in a method in which an error between a target light field and a light field to be actually reproduced is minimized through various algorithms. Such algorithms may require a large amount of calculations due to a great number of iterative calculations, and may have difficulty in representing accurate brightness of a ray.

The display device according to some example embodiments accurately reproduces a target light field through a small amount of calculations in a layered display. To this end, the display device accurately reproduces a desired light field absent an iterative algorithm (1) by reducing a number of rays to be reproduced to a number of all pixels within a laminated panel through reproduction of a light field corresponding to a current eye position using an eye position tracking, and (2) by expanding a range of pixel values of pixels within the laminated panel.

Display Device Using Viewpoint Tracking According to Some Example Embodiments

Figure 2:
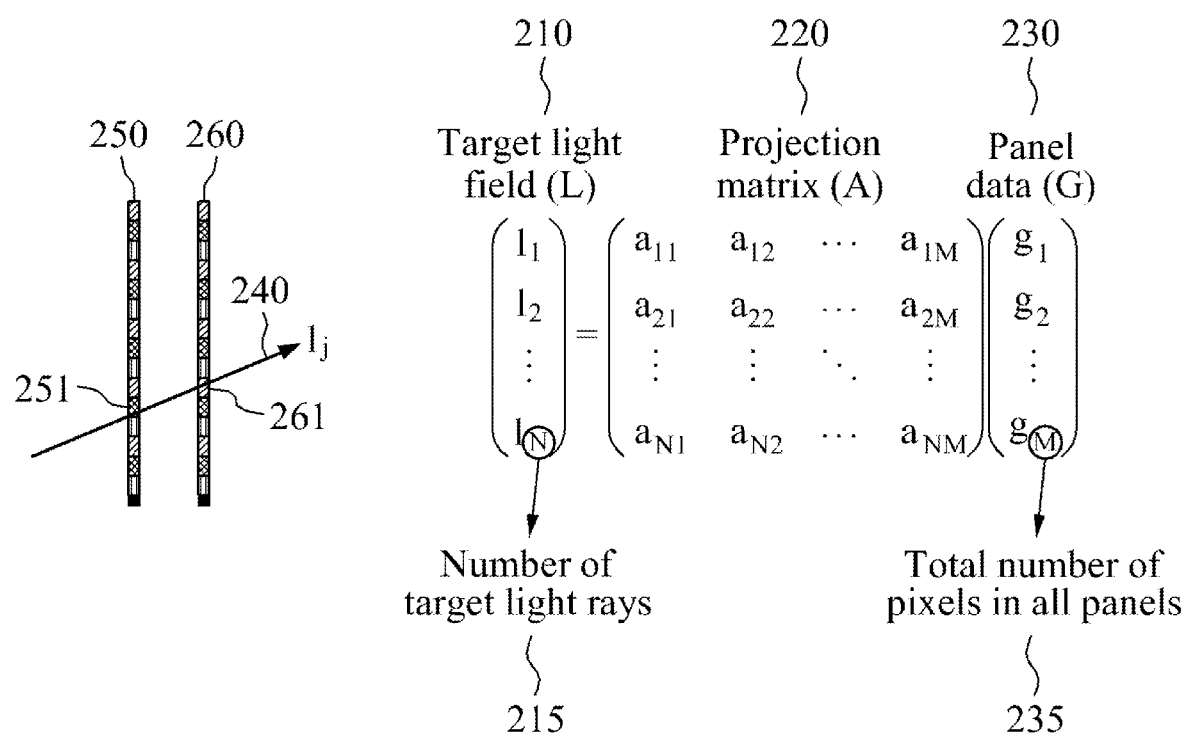
FIG. 2 illustrates a linear approximation between a pixel value in a laminated panel and rays according to some example embodiments.

FIG. 2 illustrates a linear approximation between a pixel value in a laminated panel and rays according to some example embodiments. A display device according to some example embodiments reproduces an accurate light field by reproducing a ray corresponding to an eye position of a user through viewpoint tracking. Referring to FIG. 2, a relationship between the pixel value within the laminated panel and the rays is illustrated by the linear approximation. Here, a target light field 210 is calculated by matrix-multiplying a projection matrix 220 and panel data 230. For example, elements of the projection matrix 220 have values of "0" or "1". When a j-th ray 240 passes through a pixel 251 of a first layer 250 and a pixel 261 of a second layer 260, a value of an element in a column corresponding to the pixel 251 and a value of an element in a column corresponding to the pixel 261 in a j-th row are "1". Values of elements remaining aside from the elements of the pixels 251 and 261 are "0" in the j-th row. In this example, a final pixel value of the j-th ray 240 is calculated by a sum of panel data corresponding to the pixel 251 and panel data corresponding to the pixel 261.

In general, when rays facing toward a user space in a laminated panel are all reproduced within a desired viewing angle (that may or may not be predetermined), a number of rays to be reproduced may be significantly greater than a number of all pixels in the laminated panel. For example, a number "N" 215 of elements of the target light field 210 is greater than a number "M" 235 of all the pixels within the laminated panel, where "N>>M". In this example, obtaining the panel data 230 corresponding to the target light field 210 is substantially impossible through a conventional single path algorithm. Accordingly, an iterative algorithm to minimize an error between the target light field 210 and the light field to be actually reproduced needs to be used.

Figure 3:
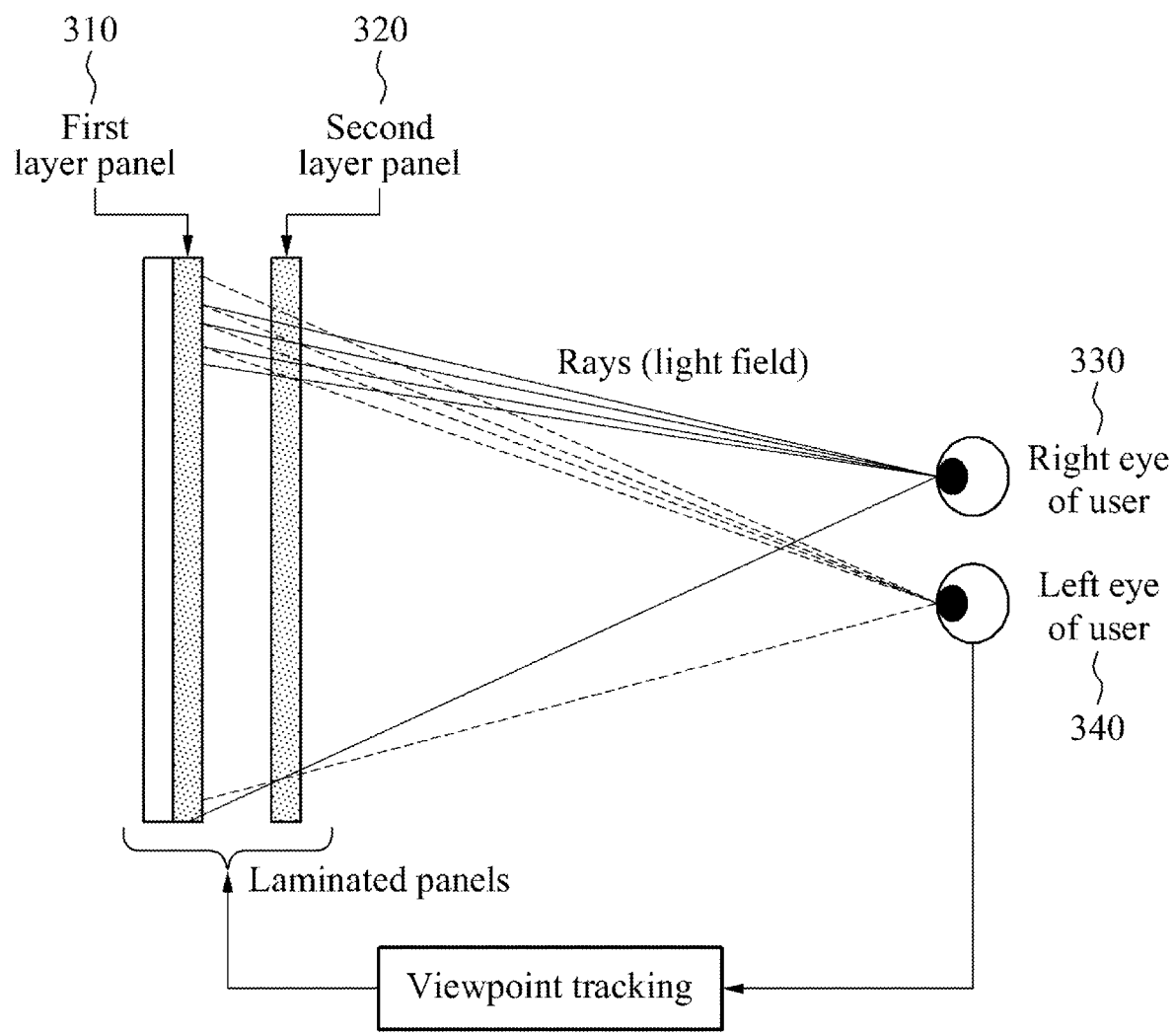
FIG. 3 illustrates a display device to reproduce rays facing toward a position of an eye of a user through viewpoint tracking according to some example embodiments.

FIG. 3 illustrates a display device to reproduce rays facing toward a position of an eye of a user through viewpoint tracking according to some example embodiments. Referring to FIG. 3, the display device according to some example embodiments reproduces rays facing toward the tracked eye position of a user based on the viewpoint tracking. In one example, a layered display is provided by laminating two panels 310 and 320 having "Np" number of pixels, resulting in a total of "M=2Np" number of pixels. The display device reproduces "Np" number of rays for a left eye 340 and a right eye 330 of a user. In this example, a resolution of a 3D image is identical to a resolution of an "Np" panel, and the number "N=2Np" of all the rays is identical to the number "M=2Np" of all the pixels. Accordingly, the display device calculates the panel data corresponding to the target light field using the single path algorithm.

Display Device to Modulate Pixel Value in Both Directions According to Some Example Embodiments A display device according to some example embodiments expands a representation area of a panel pixel. Accordingly, the display device may provide a technology for enhancing a quality of a represented image through a small amount of calculations. For example, the display device includes a laminated panel based on an attenuation modulation method or a polarization rotation modulation method.

In the attenuation modulation method, brightness of a plurality of rays within a light field is represented by multiplying transmittances or attenuations of pixels within the laminated panel through which the plurality of rays transmits. In general, a plurality of pixels included in a panel in the attenuation modulation method may appropriately attenuate brightness of a ray delivered from a rear layer, for example, a rear panel, however, may not increase the brightness. Accordingly, the plurality of pixels is represented by a value having a single code. For example, when a maximum/minimum attenuation is normalized to [0, 1] in a positive range, a range of a value for the plurality of pixels in the attenuation modulation method may be [0, 1], and may not have a negative value. In the conventional polarization rotation modulation method, each of the plurality of pixels may be represented by a value having a single code. In the polarization rotation modulation method, a polarization rotation direction in which each of the plurality of pixels modulates is a single direction, and a rotation is in a range from 0 degrees to 90 degrees. For example, a maximum/minimum polarization rotation to be modulated by each of the plurality of pixels may be normalized to be in a range of [0, 1], and may not have an opposite direction, or a negative value. Due to such a limited range of pixel values, an error occurs in obtaining a solution of panel data to reproduce a light field in Equation of FIG. 2. Also, an amount of calculations required to obtain the solution of the panel data increases because an iterative algorithm is needed to reduce the occurring error.

Figure 4:
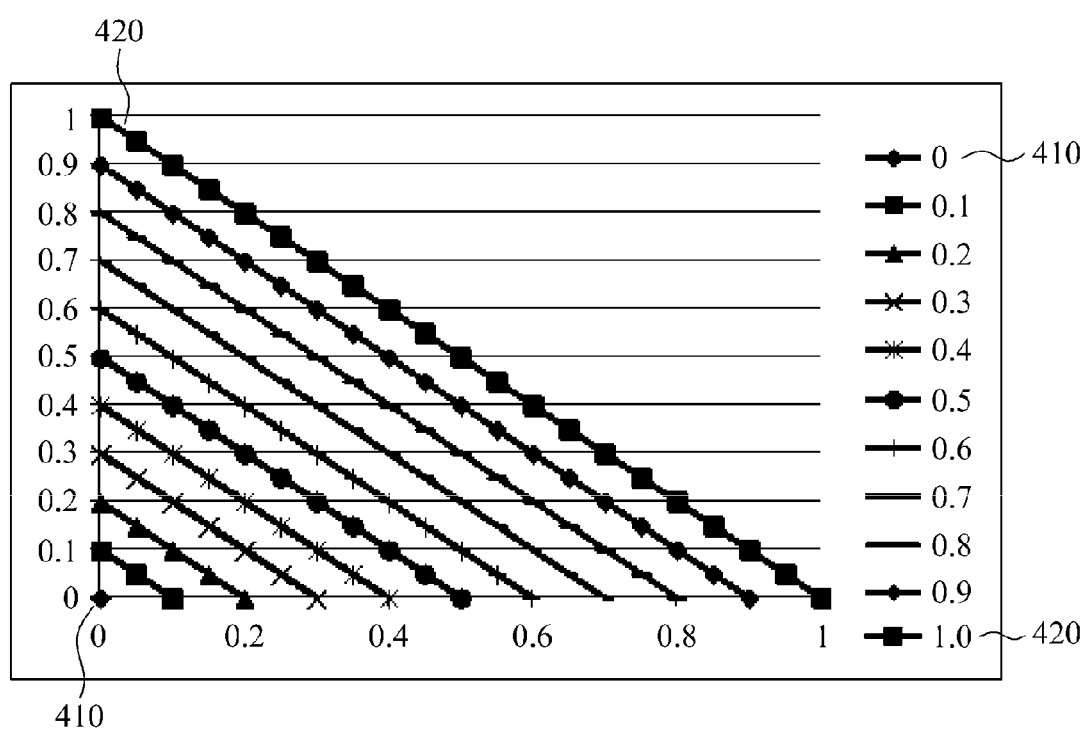
FIG. 4 illustrates a correlation between signal values of front/rear layers that represent a final brightness value in a [0, 1] range in a layered display according to the related art.

FIG. 4 illustrates a correlation between signal values of front/rear layers that represent a final brightness value in a [0, 1] range in a layered display according to the related art. In a graph of FIG. 4, an x axis corresponds to a signal value of the front layer, and a y axis corresponds to a signal value of a rear layer. As used herein, the signal value refers to a value obtained by normalizing a [minimum, maximum] magnitude of attenuation or a polarization rotation by a pixel value within a laminated panel to [0, 1]. Referring to FIG. 4, a candidate group of signal values of the front/rear layers is formed differently based on a final brightness value to be represented. For example, a candidate group 420 to represent a final bright value "1.0" differs from a candidate group 410 to represent a final brightness value "0.0". In this example, a size of the candidate group decreases as the final brightness value to be represented decreases. In one example, the candidate group 410 to represent the final brightness value "0.0" includes a candidate of which all signal values of the front/rear layers are "0". When the candidate group is limited, a desired signal may not be accurately represented on both eyes, and crosstalk may occur between an image for a left eye and an image for a right eye.

Figure 5:
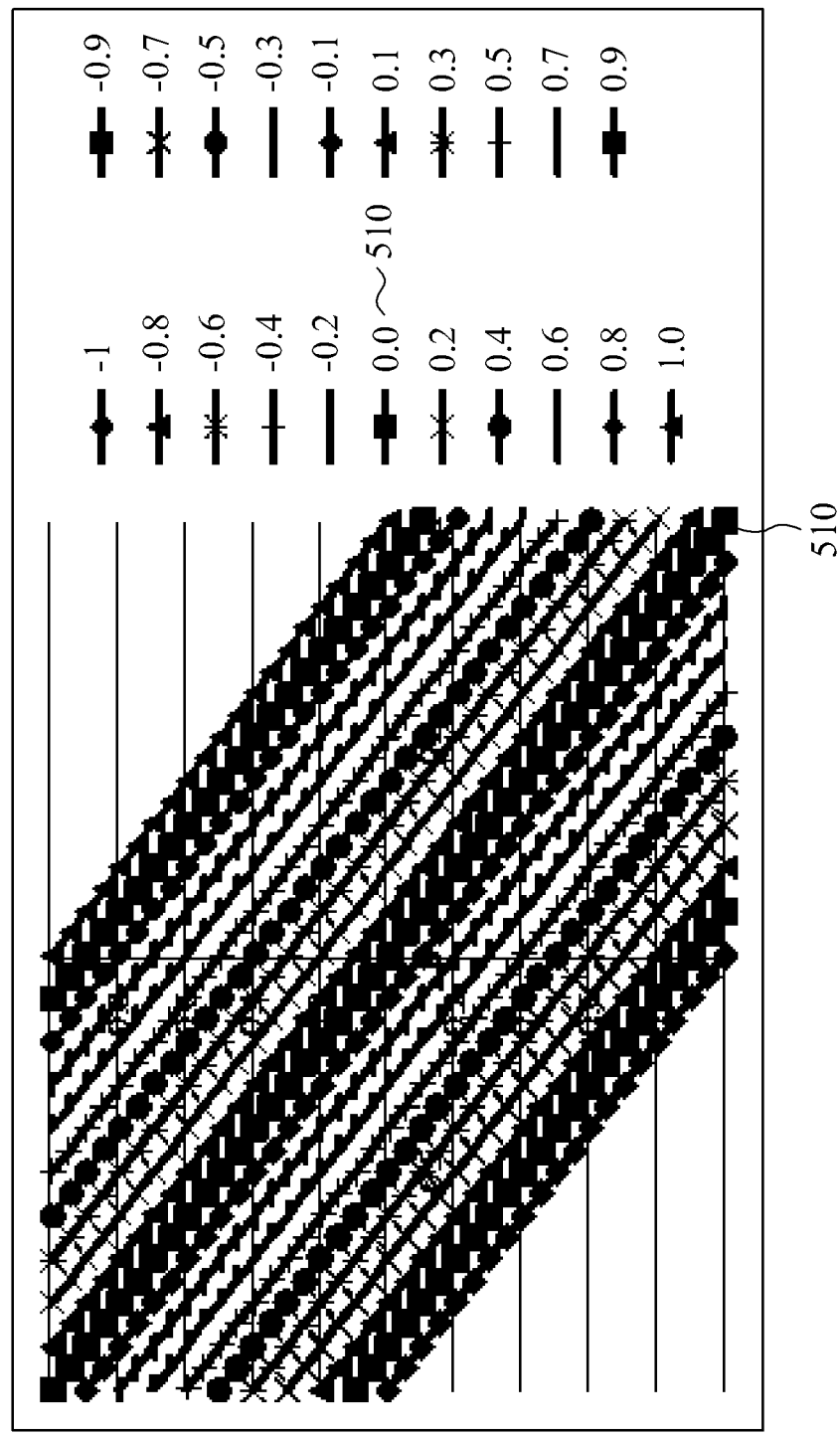
FIG. 5 illustrates a correlation between signal values of front/rear layers that represent a final brightness value of a ray when a range of a signal value in a laminated panel is expanded to [−1, 1] according to some example embodiments.

FIG. 5 illustrates a correlation between signal values of front/rear layers that represent a final brightness value of a ray when a range of a signal value in a laminated panel is expanded to [−1, 1] according to some example embodiments. As used herein, the signal value is present in a range of [0, 1] and in a range of [−1, 0]. In an attenuation modulation method, the [−1, 0] range indicates an attenuation in an opposite direction to an attenuation in the [0, 1] range. Alternatively, in the polarization rotation modulation method, the [−1, 0] range indicates a polarization rotation in an opposite direction to a polarization rotation in the [0, 1] range. When a signal in the [0, 1] range is in a direction in which brightness of a ray attenuates, a signal value in the [−1, 0] range is in a direction in which the brightness of the ray increases. Referring to FIG. 5, a size of a candidate group to represent a desired final brightness value (that may or may not be predetermined) of a ray remarkably increases when compared to FIG. 4. For example, the candidate group 410 to represent the final brightness value "0.0" includes the candidate of which all the signal values of the front/rear layers are "0" in FIG. 4. However, the candidate group 510 to represent the final brightness value "0.0" of FIG. 5 includes combinations of various signal values of the front/rear layers. When a range of signal values within a laminated panel is expanded to a [−1, 1] range according to some example embodiments, a signal value for a layer to represent a desired final brightness value (that may or may not be predetermined) is determined at all times. Accordingly, crosstalk between images reproduced for both eyes of a user is removed, and an accurate stereoscopic image is represented according to some example embodiments.

Figure 6:
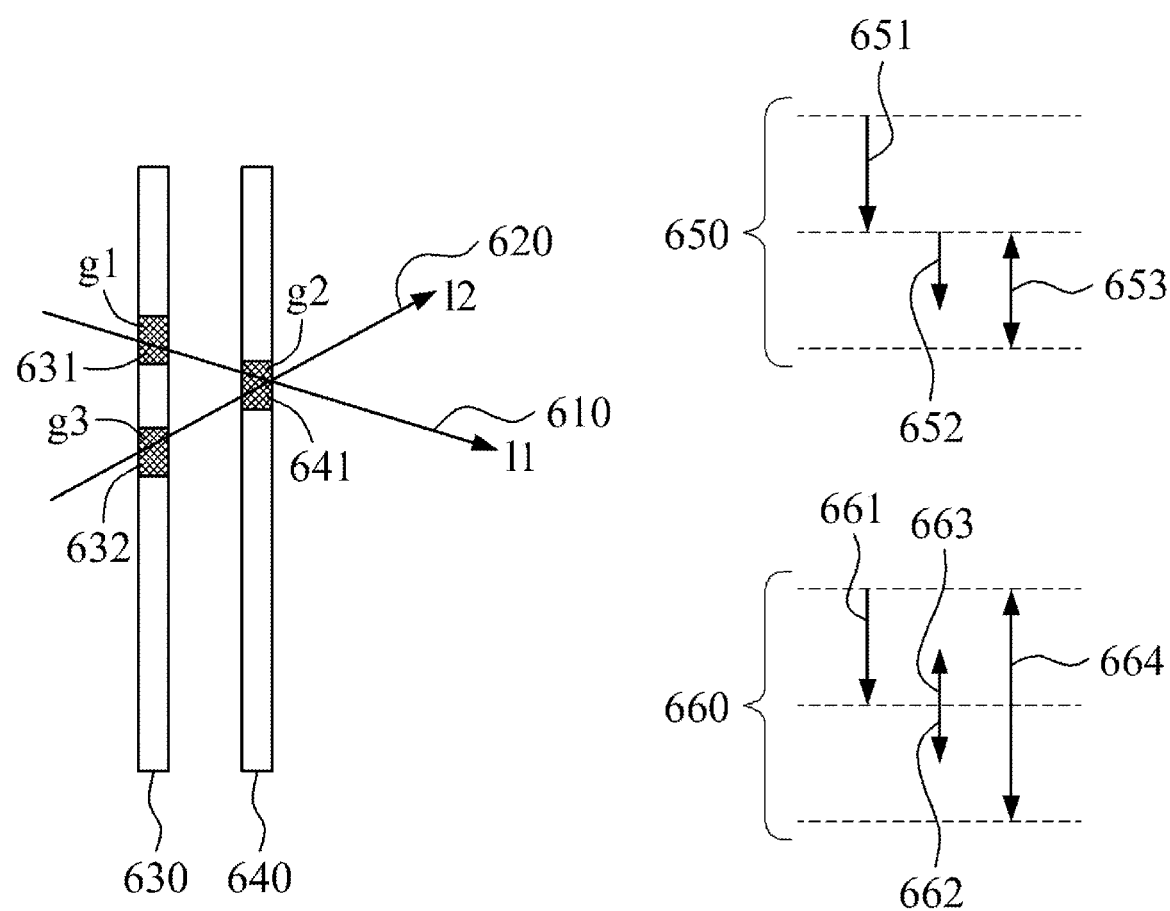
FIG. 6 illustrates an effect of a representable final brightness area being expanded when a representation area of a panel pixel is expanded in an attenuation modulation method according to some example embodiments.

FIG. 6 illustrates an effect of a representable final brightness area being expanded when a representation area of a panel pixel is expanded in an attenuation modulation method according to some example embodiments. Referring to FIG. 6, two rays "l1" 610 and "l2" 620 pass through a laminated panel including two layers 630 and 640. The rays "l1" 610 and "l2" 620 configure a target light field. Here, the ray "l1" 610 passes through a pixel "g1" 631 of a layer 630 and a pixel "g2" 641 of a layer 640. The ray "l2" 620 passes through a pixel "g3" 632 of a layer 630 and a pixel "g2" 641 of a layer 640. Hereinafter, when pixel values for the ray "l1" 610 are determined, and based on a result of the determination, pixel values for the ray "l2" 620 are determined subsequently, a pixel value for the pixel "g3" 632 is determined in a state in which a pixel value for the pixel "g2" 641 is determined in advance from among the pixel values for the ray "l2" 620.

When a range of pixel values modulatable in a plurality of layers is limited in one direction or code, brightness of the ray "12" 620 previously attenuated by the pixel "g2" 641 may not be increased any further. In this example, reproducing a desired brightness of the ray "12" 620 may not be achieved despite continuously changing the pixel value for the pixel "g3" 632. For example, when the brightness of the ray "12" 620 is attenuated by the pixel "g2" 641 by a degree of an identification code 651, the pixel "g3" 632 may attenuate the brightness of the ray "12" 620 in a direction of the identification code 652. As a result, a representable brightness area 653 of the ray "12" 620 may not cover an entire brightness area 650. For example, the ray "12" 620 may not be reproduced in an accurate brightness value due to interference of the ray "11" 610.

However, when the range of the modulatable pixel values is expanded in both directions or codes according to some example embodiments, the pixel value for the pixel "g3" 632 for the accurate brightness value of the ray "12" 620 may be calculated irrespective of the pixel value of the pixel "g2" 641. In this example, a pixel value of a positive code refers to a pixel of a panel attenuating brightness of a light, and a pixel value of a negative code refers to a pixel of a panel increasing brightness of a light. For example, when the brightness of the ray "12" 620 is attenuated by the pixel "g2" 641 by a degree of an identification code 661, the pixel "g3" 632 may modulate the brightness of the ray "12" 620 in both directions of an identification code 662 and an identification code 663. As a result, a representable brightness area 664 of the ray "12" 620 may cover an entire brightness area 660. For example, the ray "12" 620 may be reproduced in an accurate brightness value, absent interference of the ray "11" 610.

The method of FIG. 6 may be used in more general purpose systems and/or for methods of controlling such systems. For example, the method may be used in various display systems and/or for controlling such systems so as to allow viewing by multiple viewers. The method may include, for example, tracking eye positions of a user and/or displaying images to the user with accurate brightness values.

Figure 7:
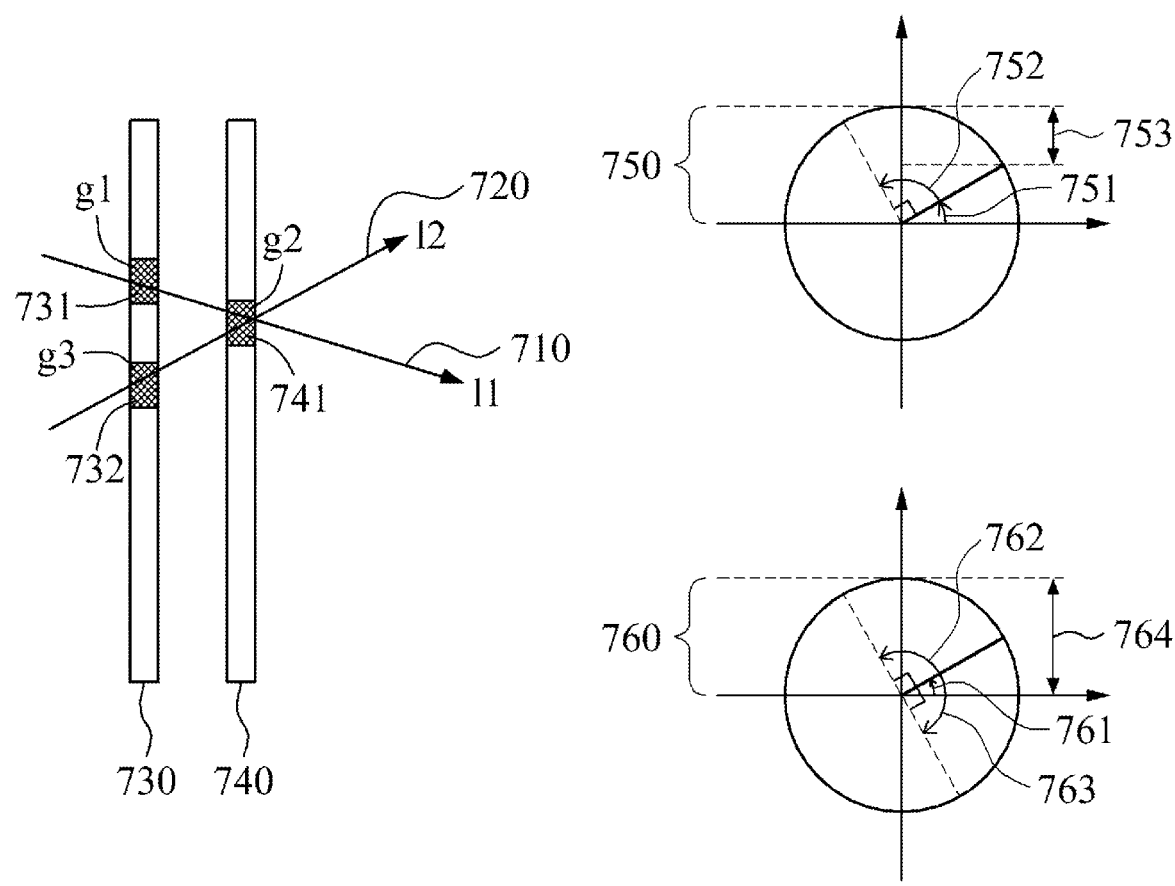
FIG. 7 illustrates an effect of a representable final brightness area being expanded when a representation area of a panel pixel is expanded in a polarization rotation modulation method according to some example embodiments.

FIG. 7 illustrates an effect of a representable final brightness area being expanded when a representation area of a panel pixel is expanded in a polarization rotation modulation method according to some example embodiments. Referring to FIG. 7, two rays "11" 710 and "12" 720 pass through a laminated panel including two layers 730 and 740. The rays "11" 710 and "12" 720 configure a target light field. Here, the ray "11" 710 passes through a pixel "g1" 731 of the layer 730 and a pixel "g2" 741 of the layer 740. The ray "12" 720 passes through a pixel "g3" 732 of the layer 730 and the pixel "g2" 741 of the layer 740. Hereinafter, when pixel values for the ray "11" 710 are determined, and based on a result of the determination, pixel values for the ray "12" 720 are determined subsequently, a pixel value for the pixel "g3" 732 is determined in a state in which a pixel value for the pixel "g2" 741 is determined in advance from among the pixel values for the ray "12" 720.

When a polarization rotation modulatable in a plurality of layers is limited to 90 degrees, reproducing a desired brightness of the ray "12" 720 may not be achieved despite continuously changing the pixel value for the pixel "g3" 732 due to the polarization rotation of the ray "12" 720 previously modulated. For example, when the polarization rotation of the ray "12" 720 is modulated by the pixel "g2" 741 by a degree of an identification code 751, the pixel "g3" 732 may modulate the polarization rotation of the ray "12" 720 within 90 degrees in a direction of an identification code 752. As a result, a representable brightness area 753 of the ray "12" 720 may not cover an entire brightness area 750. For example, the ray "12" 720 may not be reproduced in an accurate brightness value due to interference of the ray "11" 710.

However, when the range of the modulatable pixel values is expanded in both directions or codes according to some example embodiments, the pixel value for the pixel "g3" 732 may be calculated for the accurate brightness value for the ray "12" 720 irrespective of the pixel value for the pixel "g2" 741. In this example, a pixel value for a positive code refers to a pixel of a panel modulating a polarization rotation of a light counter-clockwise, and a pixel value for a negative code refers to a pixel of a panel modulating a polarization rotation of a light clockwise. For example, when the polarization rotation of the ray "12" 720 is modulated by the pixel "g2" 741 by a degree of an identification code 761, the pixel "g3" 732 may modulate the polarization rotation of the ray "12" 720 in both directions of an identification code 762 and an identification code 763. As a result, a representable brightness area 764 of the ray "12" 720 may cover an entire brightness area 760. For example, the ray "12" 720 may be reproduced in an accurate brightness value, absent interference of the ray "11" 710.

The method of FIG. 7 may be used in more general purpose systems and/or for methods of controlling such systems. For example, the method may be used in various display systems and/or for controlling such systems so as to allow viewing by multiple viewers. The method may include, for example, tracking eye positions of a user and/or displaying images to the user with accurate brightness values.

Figure 8:
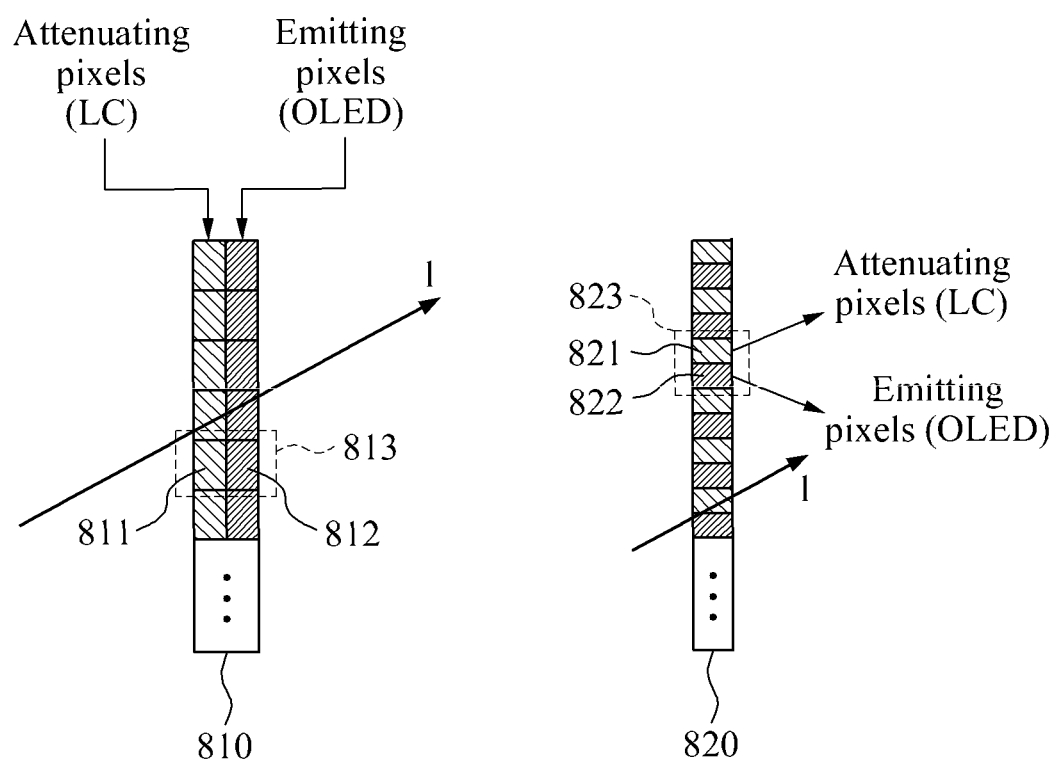
FIG. 8 illustrates a layer configuration of a display device in an attenuation modulation method according to some example embodiments.

Layer Configuration of Display Device in Attenuation Modulation Method According to Some Example Embodiments FIG. 8 illustrates a layer configuration of a display device in an attenuation modulation method according to some example embodiments. The layer configuration of the display device in the attenuation modulation method may be implemented in various manners. In one example, referring to a layer 810, a single macro pixel 813 is provided by a parallel combination of an attenuating pixel 811 to attenuate brightness of an input ray "1" and an emitting pixel 812 to increase brightness of the input ray "1". The macro pixel 813 operates as a pixel in a range of a pixel value extended to have both of a positive code and a negative code. In this example, a single layer is generated by attaching a layer for an attenuating pixel to a layer for an emitting pixel. In another example, referring to a layer 820, a single macro pixel 823 is provided by a serial combination of an attenuating pixel 821 and an emitting pixel 822. The macro pixel 823 operates as a pixel in a range of a pixel value extended to have both of a positive code and a negative code. In this example, an attenuating pixel includes an LC-based pixel, and an emitting pixel includes a self-emitting pixel, such as an organic light-emitting diode (OLED).

Figure 9:
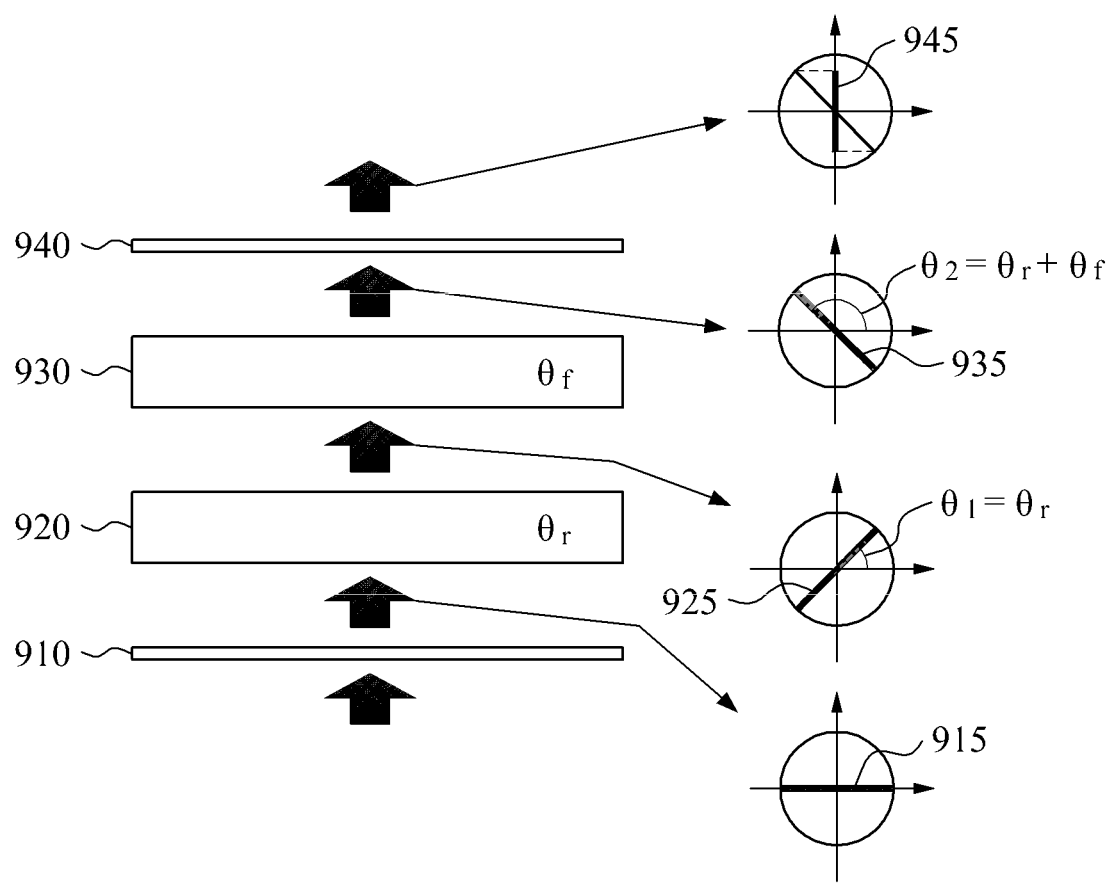
FIGS. 9 and 10 illustrate characteristics of a plurality of panels included in a display device in a polarization rotation modulation method according to some example embodiments.

Layer Configuration of Display Device in Polarization Rotation Modulation Method According to Some Example Embodiments FIG. 9 illustrates characteristics of a plurality of panels included in a display device in a polarization rotation modulation method according to some example embodiments. Referring to FIG. 9, a rear polarizing filter 910 allows a light 915 having a 0 degree polarization direction to pass through. A rear layer 920 receives the light 915 and outputs a light 925 rotated by $\theta_r$. A front layer 930 receives the light 925 and outputs a light 935 rotated by $\theta_f$. For example, the light 915 is rotated by $\theta_2=\theta_r+\theta_f$ when passing through the rear layer 920 and the front layer 930. A front polarizing filter 940 allows a light 945 having a 90 degree polarization direction to pass through.

Characteristics of a plurality of panels included in the display device in the polarization rotation modulation method according to some example embodiments are represented by Equation 1.

$$\theta_2=\theta_r+\theta_f$$

$$0 \leq \theta_r, \theta_f \leq \tau \quad \text{[Equation 1]}$$

For example, a plurality of laminated panels (1) has a characteristic of an extended polarization modulation range between 0 degrees to 180 degrees, and (2) has a characteristic in which a total of polarization rotations for the plurality of laminated panels are calculated by a linear sum of the polarization rotations for the plurality of laminated panels. In this example, the characteristic (1) is required to accurately reproduce a light field as described above, and the characteristic (2) is required to configure an overall equation with the linear equation of FIG. 2. The display device in the polarization rotation modulation method according to some example embodiments utilizes a panel having a polarization rotation angle range between 0 degrees to 180 degrees. The panel having the polarization rotation angle range between 0 degrees to 180 degrees may be implemented in various manners.

In one example, in a twisted nematic (TN) LC mode, the panel having the polarization rotation angle range between 0 degrees to 180 degrees is implemented by setting a twist angle of LC directors to 180 degrees. By way of example, the panel having the polarization rotation angle range between 0 degrees to 180 degrees is implemented using a TN LC having a 180 degree twist angle and a phase retardation in integer multiples of 360 degrees. A polarization rotation matrix "M" that modulates a polarization rotation in a TN LC in a single domain is calculated by Equation 2. As used herein, the single domain refers to a single sub-pixel including a single domain.

$$M = \begin{pmatrix} \cos\phi & -\sin\phi \\ \sin\phi & \cos\phi \end{pmatrix} \begin{pmatrix} \cos X - i\frac{\Gamma}{2}\frac{\sin X}{X} & \phi\frac{\sin X}{X} \\ -\phi\frac{\sin X}{X} & \cos X + i\frac{\Gamma}{2}\frac{\sin X}{X} \end{pmatrix} \quad \text{[Equation 2]}$$

$$X = \sqrt{\phi^2 + \left(\frac{\Gamma}{2}\right)^2} \quad \begin{array}{l}\phi: \text{Twist angle} \\ \Gamma: \text{Retardation}\end{array} \quad \Gamma = \frac{2\pi}{\lambda}(n_e - n_o)d$$

In Equation 2, $\Gamma$ denotes a phase retardation, and is calculated by a difference in a phase retardation occurring when two polarized lights perpendicular to each other pass through an LC molecule. A light passing through the LC molecule undergoes phase retardations differing based on a polarization direction. "$n_e$" and "$n_o$" each denote a refractive index of two polarized lights perpendicular to each other, and "d" denotes a thickness of an LC layer. Accordingly, "$n_e$" and "$n_o$" are adjusted by adjusting an LC material, and "d" is adjusted by adjusting the thickness of the LC layer. $\lambda$ denotes a wavelength of a light, and $\phi$ denotes a twist angle.

When $\Gamma \gg \phi$, "M" is expressed by Equation 3.

$$M \approx \begin{pmatrix} \cos\phi & -\sin\phi \\ \sin\phi & \cos\phi \end{pmatrix} \begin{pmatrix} e^{-j\frac{\Gamma}{2}} & 0 \\ 0 & e^{j\frac{\Gamma}{2}} \end{pmatrix} \quad \text{[Equation 3]}$$

Figure 10:
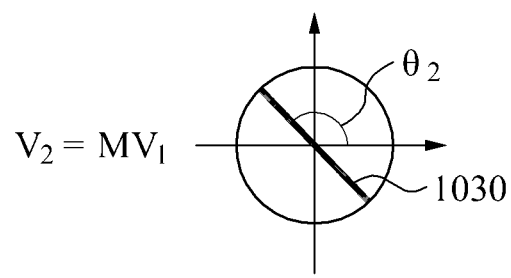
Figure 10:
Figure 10:
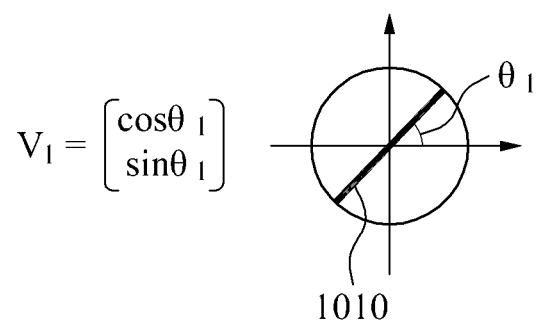

Referring to FIG. 10, $V_1$ denotes a vector representing a light 1010 of which a polarization rotation is modulated by $\theta_1$ from a previous layer. The light 1010 is rotated further when passing through a current layer 1020. In this instance, $V_1$ is modulated by the polarization rotation matrix "M" of the current layer 1020 with reference to Equation 4.

$$V_2 = MV_1 = \begin{pmatrix} e^{-j\frac{\Gamma}{2}}\cos\phi\cos\theta_1 - e^{j\frac{\Gamma}{2}}\sin\phi\sin\theta_1 \\ e^{-j\frac{\Gamma}{2}}\sin\phi\cos\theta_1 - e^{j\frac{\Gamma}{2}}\sin\phi\sin\theta_1 \end{pmatrix} \quad \text{[Equation 4]}$$

When $\Gamma$ is integer multiples of $2\pi$, Equation 4 is given by Equation 5.

$$V_2 = MV_1 = \begin{pmatrix} \cos(\phi+\theta_1) \\ \sin(\phi+\theta_1) \end{pmatrix} \quad \text{[Equation 5]}$$

For example, when $\Gamma$ is controlled to be integer multiples of $2\pi$ in the TN LC in the single domain, and $\phi$ is controlled to be within 180 degrees, the panel having the polarization rotation angle range between 0 degrees to 180 degrees is implemented.

In another example, in an in-plane switching (IPS) LC mode, the panel having the polarization rotation angle range between 0 degrees to 180 degrees is implemented by setting a rotation angle range with respect to an input voltage of an LC director to a range between 0 degrees to 90 degrees. By way of example, the panel having the polarization rotation angle range between 0 degrees to 180 degrees is implemented using a single domain, a 90 degree LC director in-plane rotation range, and an IPS panel having a phase retardation in odd multiples of 180 degrees. A polarization rotation matrix "M" that modulates a polarization rotation in an IPS LC in a single domain is calculated by Equation 6.

$$M = \begin{pmatrix} \cos\phi & -\sin\phi \\ \sin\phi & \cos\phi \end{pmatrix} \begin{pmatrix} e^{j\Gamma} & 0 \\ 0 & 1 \end{pmatrix} \begin{pmatrix} \cos\phi & \sin\phi \\ -\sin\phi & \cos\phi \end{pmatrix} \quad \text{[Equation 6]}$$

$$\begin{array}{l}\phi: \text{Director angle} \\ \Gamma: \text{Retardation}\end{array} \quad \Gamma = \frac{2\pi}{\lambda}(n_e - n_o)d$$

Referring to FIG. 10, $V_1$ denotes a vector representing the light 1010 of which the polarization rotation is modulated by $\theta_1$ from the previous layer. The light 1010 is rotated further when passing through the current layer 1020. In this instance, $V_1$ is modulated by the polarization rotation matrix "M" of the current layer 1020 with reference to Equation 7. $V_2$ denotes a vector representing the resulting light 1030.

$$V_2 = MV_1 = \begin{pmatrix} e^{j\Gamma}\cos\phi\cos(\theta_1-\phi) - \sin\phi\sin(\theta_1-\phi) \\ e^{j\Gamma}\sin\phi\cos(\theta_1-\phi) + \cos\phi\sin(\theta_1-\phi) \end{pmatrix} \quad \text{[Equation 7]}$$

In Equation 7, when Γ is odd multiples of π, Equation 7 is given by Equation 8.

$$V_2 = MV_1 = \begin{pmatrix} \cos(2\phi - \theta_1) \\ \sin(2\phi - \theta_1) \end{pmatrix}$$ [Equation 8]

Alternatively, Equation 7 is represented by Equation 9 using a half wave plate (HWP).

$$V_2 = MV_1 = \begin{pmatrix} \cos(2\phi + \theta_1) \\ \sin(2\phi + \theta_1) \end{pmatrix}$$ [Equation 9]

For example, when Γ is controlled to be odd multiples of π in the IPS LC in the single domain, and φ is controlled to be within 90 degrees, the panel having the polarization rotation angle range between 0 degrees to 180 degrees is implemented.

Figure 11A:
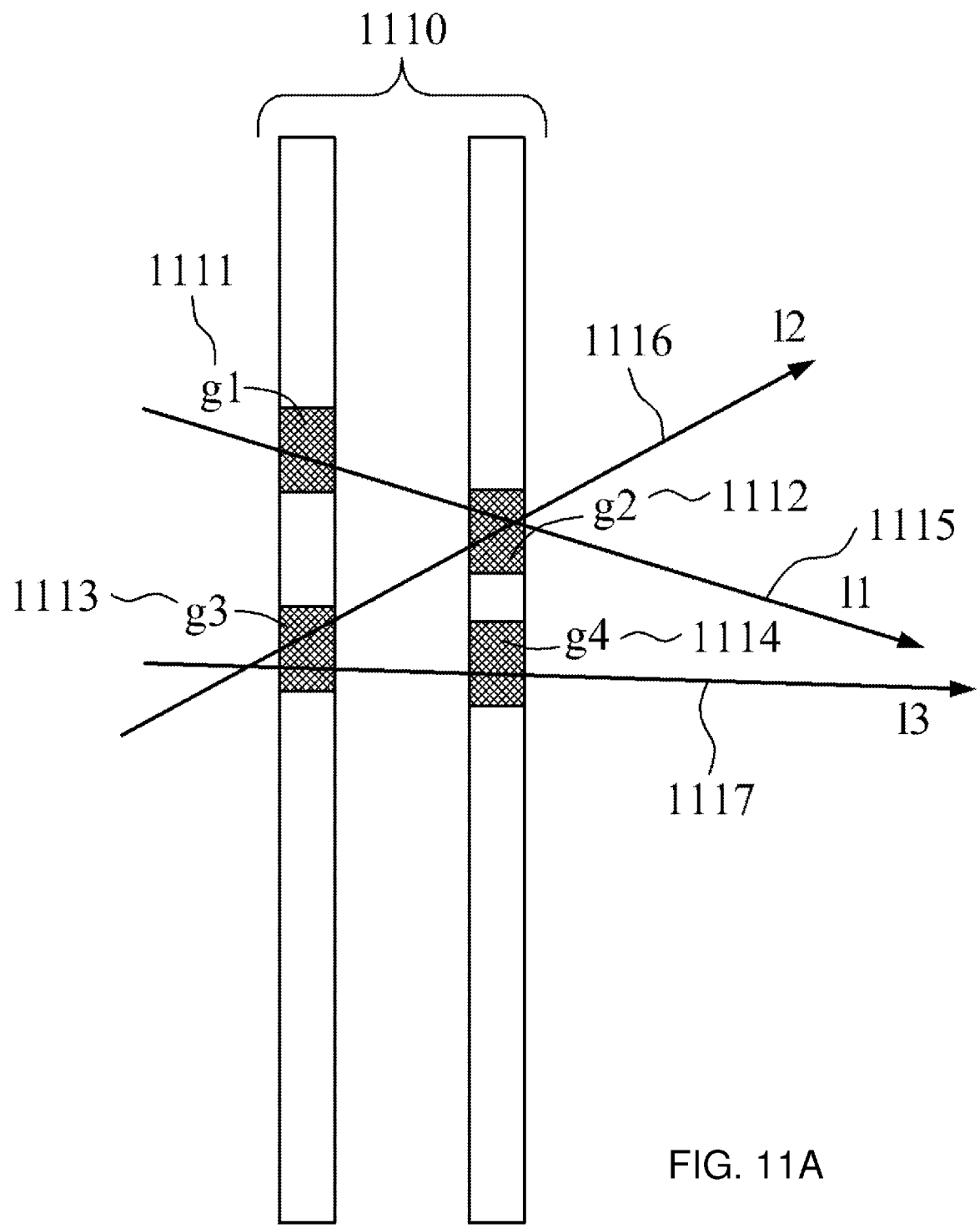
FIG. 11A illustrates a method of calculating a pixel value of a pixel according to some example embodiments using a diagram.
Figure 11B:
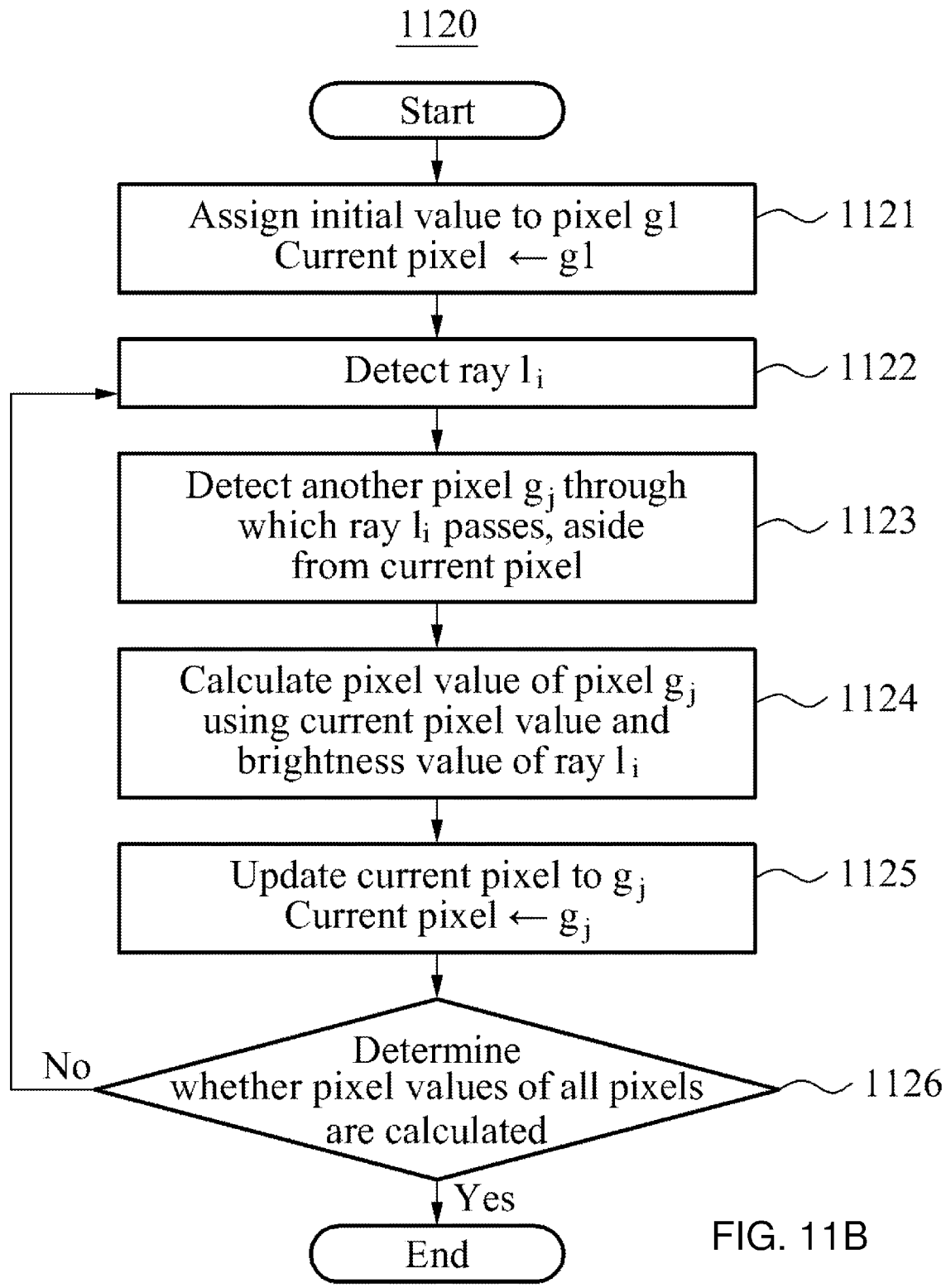
FIG. 11B illustrates the method of FIG. 11A of calculating a pixel value of a pixel according to some example embodiments using a flowchart.

Method of Calculating Pixel Value of Pixel According to Some Example Embodiments FIG. 11A illustrates a method of calculating a pixel value of a pixel according to some example embodiments using a diagram, while FIG. 11B illustrates the method of FIG. 11A of calculating a pixel value of a pixel according to some example embodiments using a flowchart. According to some example embodiments, a pixel value for a plurality of pixels included in a plurality of layers is calculated using a simple sequential algorithm without iteration. For example, referring to FIG. 11A, pixel values for a pixel "g1" 1111, a pixel "g2" 1112, a pixel "g3" 1113, and a pixel "g4" 1114 included in a laminated panel 1110 are sequentially calculated without iteration based on the flowchart 1120 of FIG. 11B.

In operation 1121, a desired value (that may or may not be predetermined) is assigned to the pixel "g1" 1111 of the laminated panel 1110. In operation 1122, a ray "11" 1115 passing through the pixel "g1" 1111 is detected. In operation 1123, another pixel "g2" 1112 through which the detected ray "11" 1115 passes is detected. In operation 1124, a pixel value for the pixel "g2" 1112 is determined using the pixel value for the pixel "g1" 1111 and a brightness value for the ray "11" 1115. In this example, the pixel value for the pixel "g2" 1112 corresponding to the desired pixel value (that may or may not be predetermined) for the pixel "g1" 1111 and the brightness value for the ray "11" 1115 is accurately determined due to an extended pixel value range according to some example embodiments. In operation 1125, the current pixel is updated to the pixel "g2" 1112.

Pixel values for all of the plurality of pixels are determined by iterating operations 1122 through 1125. For example, in operation 1122, a ray "12" 1116 passing through the pixel "g2" 1112 is detected. In operation 1123, the other pixel "g3" 1113 through which the detected ray "12" 1116 passes is detected. In operation 1124, a pixel value for the pixel "g3" 1113 is determined using the pixel value for the pixel "g2" 1112 and a brightness value for the ray "12" 1116. In this example, the pixel value for the pixel "g3" 1113 corresponding to the desired pixel value (that may or may not be predetermined) for the pixel "g2" 1112 and the brightness value for the ray "12" 1116 is accurately determined due to an extended pixel value range according to some example embodiments. In operation 1125, the current pixel is updated to the pixel "g3" 1113.

Also, in operation 1122, a ray "13" 1117 passing through the pixel "g3" 1113 is detected. In operation 1123, the other pixel "g3" 1113 through which the detected ray "12" 1116 passes is detected. In operation 1124, a pixel value for the pixel "g4" 1114 is determined using the pixel value for the pixel "g3" 1113 and a brightness value for the ray "13" 1117. In this example, the pixel value for the pixel "g4" 1114 corresponding to the desired pixel value (that may or may not be predetermined) for the pixel "g3" 1113 and the brightness value for the ray "13" 1117 is accurately determined due to an extended pixel value range according to some example embodiments. In operation 1126, whether the pixel values for all of the plurality of pixels are determined is verified.

The method of FIG. 11B may be used in more general purpose systems and/or for methods of controlling such systems. For example, the method may be used in various display systems and/or for controlling such systems so as to allow viewing by multiple viewers. The method may include, for example, tracking eye positions of a user and/or displaying images to the user with accurate brightness values.

Configuration of Display Device According to Some Example Embodiments

Figure 12:
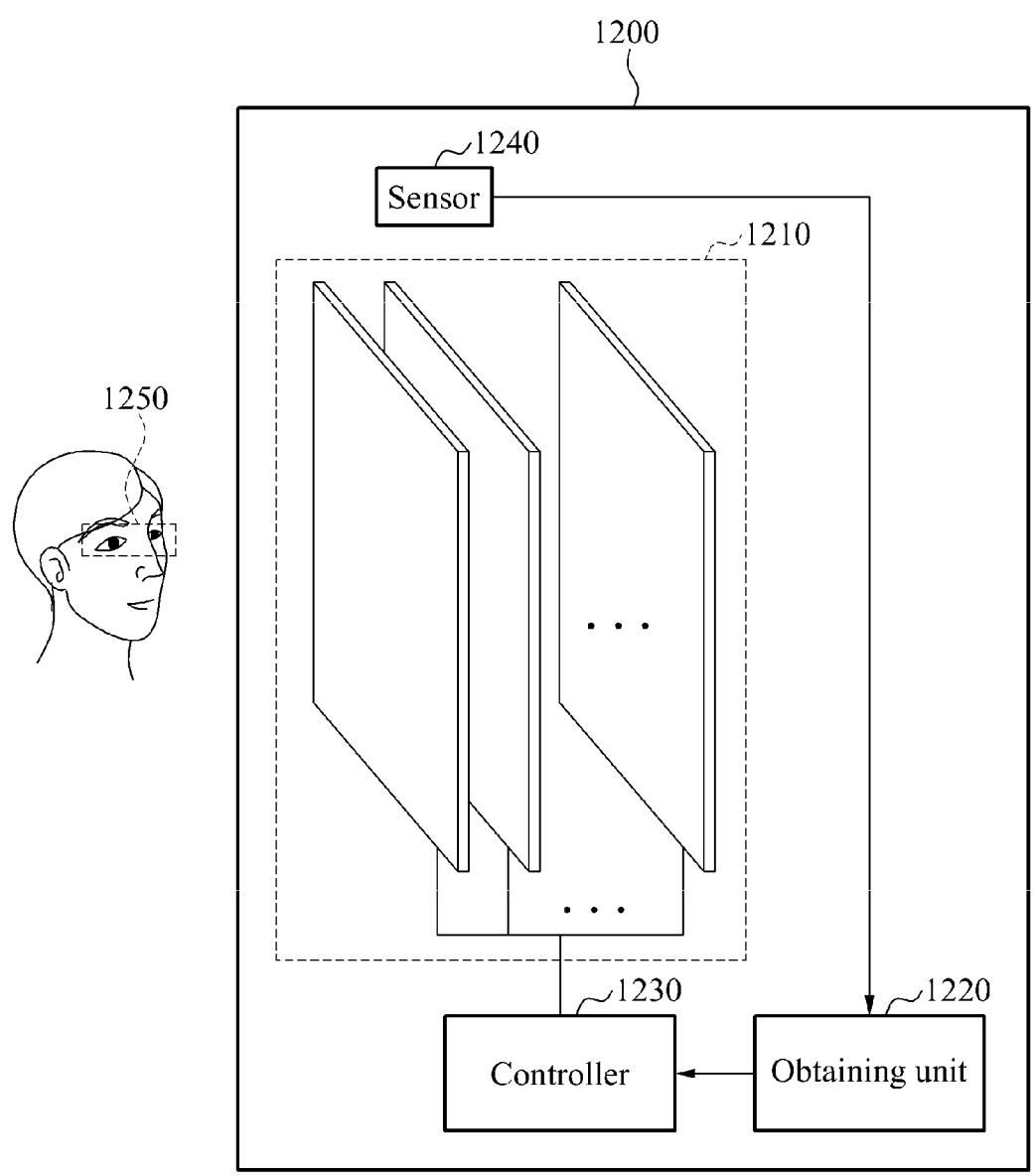
FIG. 12 illustrates a display device according to some example embodiments.

FIG. 12 illustrates a display device 1200 according to some example embodiments. Referring to FIG. 12, the display device 1200 includes a plurality of layers 1210, an obtaining unit 1220, and a controller 1230. The plurality of layers 1210 displays a stereoscopic image using a layered display structure.

The obtaining unit 1220 obtains matching information corresponding to a target position. Here, the target position includes a position to display a stereoscopic image. For example, the target position may be an eye position 1250 of a user. The matching information includes matching information about matching of pixels belonging to differing layers. The obtaining unit 1220 according to some example embodiments, the obtaining unit 1220 loads the matching information corresponding to the target position from a storage space provided in advance, using the target position. In this example, the storage space provided in advance includes a memory included in the display device or a database disposed in a remote position and in wired/wireless connection with the display device. The obtaining unit 1220 according to some example embodiments directly generates the matching information using the target position.

The controller 1230 controls the plurality of layers 1210 to represent a stereoscopic image at the target position based on the matching information. The display device may further include a sensor 1240 to sense the target position. Since the technical features described with reference to FIGS. 1 through 11 may be directly applied to each module of FIG. 12, a detailed description will be omitted for conciseness.

The algorithms discussed in this application (e.g., for creating images) may be used in more general purpose apparatuses and/or methods of controlling apparatuses. For example, the algorithms may be used in apparatuses for displaying images to multiple viewers and/or for controlling such apparatuses so as to allow viewing by multiple viewers.

The methods described above may be written as computer programs and can be implemented in general-use digital computers that execute the programs using a computer-readable recording medium. In addition, a structure of data used in the methods may be recorded in a computer-readable recording medium in various ways. Examples of the computer-readable recording medium include storage media such as magnetic storage media (e.g., ROM (Read-Only Memory), RAM (Random-Access Memory), USB (Universal Serial Bus), floppy disks, hard disks, etc.) and optical recording media (e.g., CD-ROMs (Compact Disc Read-Only Memories) or DVDs (Digital Video Discs)).

In addition, some example embodiments may also be implemented through computer-readable code/instructions in/on a medium (e.g., a computer-readable medium) to control at least one processing element to implement some example embodiments. The medium may correspond to any medium/media permitting the storage and/or transmission of the computer-readable code.

The computer-readable code may be recorded/transferred on a medium in a variety of ways, with examples of the medium including recording media, such as magnetic storage media (e.g., ROM, floppy disks, hard disks, etc.) and optical recording media (e.g., CD-ROMs or DVDs), and transmission media such as Internet transmission media. Thus, the medium may be such a defined and measurable structure including or carrying a signal or information, such as a device carrying a bitstream according to some example embodiments. The media may also be a distributed network, so that the computer-readable code is stored/transferred and executed in a distributed fashion. Furthermore, the processing element could include a processor or a computer processor, and processing elements may be distributed and/or included in a single device.

In some example embodiments, some of the elements may be implemented as a 'module'. According to some example embodiments, 'module' may be interpreted as software-based components or hardware components, such as a field programmable gate array (FPGA) or an application specific integrated circuit (ASIC), and the module may perform certain functions. However, the module is not limited to software or hardware. The module may be configured so as to be placed in a storage medium which may perform addressing, or to execute one or more processors.

For example, modules may include components such as software components, object-oriented software components, class components, and task components, processes, functions, attributes, procedures, subroutines, segments of program code, drivers, firmware, microcodes, circuits, data, databases, data structures, tables, arrays, and variables. Functions provided from the components and the modules may be combined into a smaller number of components and modules, or be separated into additional components and modules. Moreover, the components and the modules may execute one or more central processing units (CPUs) in a device.

Some example embodiments may be implemented through a medium including computer-readable codes/instructions to control at least one processing element of the above-described embodiment, for example, a computer-readable medium. Such a medium may correspond to a medium/media that may store and/or transmit the computer-readable codes.

The computer-readable codes may be recorded in a medium or be transmitted over the Internet. For example, the medium may include a ROM, a RAM, a CD-ROM, a magnetic tape, a floppy disc, an optical recording medium, or a carrier wave such as data transmission over the Internet. Further, the medium may be a non-transitory computer-readable medium. Since the medium may be a distributed network, the computer-readable code may be stored, transmitted, and executed in a distributed manner. Further, for example, the processing element may include a processor or a computer processor, and be distributed and/or included in one device.

It should be understood that the example embodiments described herein should be considered in a descriptive sense only and not for purposes of limitation. Descriptions of features or aspects within each embodiment should typically be considered as available for other similar features or aspects in other embodiments.

Although example embodiments have been shown and described, it would be appreciated by those skilled in the art that changes may be made in these example embodiments without departing from the principles and spirit of the disclosure, the scope of which is defined by the claims and their equivalents.

What is claimed is:

1. A display device, comprising:
a plurality of layers;
and a processor configured to,
obtain matching information associated with matching of pixels belonging to the plurality of layers, and
modulate pixel values in two directions for pixels of each of the plurality of layers based on the matching information,
wherein the two directions including a direction in which brightness of a transmitted light increases and a direction in which the brightness of the transmitted light decreases, and
wherein the processor is configured to:
control a first layer and a second layer such that a first ray passing through a first pixel included in the first layer passes through a second pixel included in the second layer to reach a first eye of a user;
control the first layer and the second layer such that a second ray passing through a third pixel included in the first layer passes through the second pixel to reach a second eye of the user;
determine a first pixel value of the first pixel and a second pixel value of the second pixel for the first ray reaching the first eye;
modulate a third pixel value of the third pixel in the two directions for the second ray reaching the second eye based on the determined second pixel value;
reproduce a light field corresponding to a 3D image based on the first ray and the second ray, and
wherein the first eye and the second eye are different eyes of a left eye and a right eye of the user, respectively.

2. The display device of claim 1, wherein
the plurality of layers comprises at least one polarizing layer, and
the processor is configured to modulate a polarization rotation clockwise and counter-clockwise of the at least one polarizing layer.

3. The display device of claim 1, wherein
the plurality of layers comprises at least one polarizing layer, and
the processor is configured to modulate a polarization rotation of the at least one polarizing layer within 180 degrees.

4. The display device of claim 1, further comprising:
a first polarizing filter on a rear side of a rearmost layer from among the plurality of layers, and
a second polarizing filter on a front side of a forefront layer from among the plurality of layers;
wherein the first polarizing filter and the second polarizing filter are configured to have polarization directions perpendicular to each other, and wherein the processor is configured to modulate a polarization rotation of light that passes through at least one of the first polarizing filter and a previous layer in the two directions.

5. The display device of claim 1, wherein the plurality of layers comprises at least one of:
a twisted nematic (TN) panel having a phase retardation in integer multiples of 360 degrees; and
an in-plane switching (IPS) panel having a phase retardation in odd multiples of 180 degrees.

6. The display device of claim 1, wherein the plurality of layers comprises:
at least one layer including a single macro pixel having a self-emitting pixel and an attenuation pixel.

7. The display device of claim 1, wherein the plurality of layers comprises:
at least one layer including a self-emitting sub-layer and an attenuation sub-layer.

8. The display device of claim 1, wherein the processor is configured to generate the matching information by selecting at least one pixel from among the plurality of layers.

9. The display device of claim 1, wherein the processor is further configured to,
receive a position of an eye of the user, and
generate the matching information based on the position of the eye of the user.

10. The display device of claim 1, wherein the matching information comprises:
first matching information associated with matching of pixels on a first path of light generated by a light-emitter reaching the left eye of the user; and
second matching information associated with matching of pixels on a second path of the light reaching the right eye of the user.

11. The display device of claim 1, wherein the processor is further configured to determine the pixel values for the plurality of layers based on a target light field and the matching information.

12. The display device of claim 1, wherein if pixel values of layers remaining subsequent to excluding one of the plurality of layers are determined with respect to a ray that passes through the plurality of layers, a pixel value of the excluded layer exists that represents a final pixel value of the ray through a combination of the determined pixel values.

13. The display device of claim 1, wherein the processor is further configured to,
detect a ray yet to be processed, that passes through a pixel currently being processed, from among a plurality of rays that passes through the plurality of layers,
detect a pixel yet to be processed through which the detected ray passes, and
calculate a pixel value of the pixel yet to be processed based on a pixel value of the pixel currently being processed.

14. The display device of claim 1, wherein the processor is further configured to control the plurality of layers to display differing images at a position of the left eye of the user and a position of the right eye of the user.

15. An image creating method, the method comprising:
obtaining a target light field;
obtaining a projection matrix corresponding to a viewpoint of a user; and
modulating pixel values in two directions for pixels of each of a plurality of layers based on the target light field and the projection matrix,
wherein the two directions include a direction in which brightness of a transmitted light increases and a direction in which the brightness of the transmitted light decreases, and
wherein the modulating the pixel values comprising:
controlling a first layer and a second layer such that a first ray passing through a first pixel included in the first layer passes through a second pixel included in the second layer to reach a first eye of a user;
controlling the first layer and the second layer such that a second ray passing through a third pixel included in the first layer passes through the second pixel to reach a second eye of the user;
determining a first pixel value of the first pixel and a second pixel value of the second pixel for the first ray reaching the first eye;
modulating a third pixel value of the third pixel in the two directions for the second ray reaching the second eye based on the determined second pixel value;
reproducing a light field corresponding to a 3D image based on the first ray and the second ray, and
wherein the first eye and the second eye are different eyes of a left eye and a right eye of the user, respectively.

16. The method of claim 15, wherein if a number of pixels in each of the plurality of layers corresponds to "n", "n" being a positive integer, the target light field includes "n" number of rays for the left eye of the user and "n" number of rays for the right eye of the user.

17. The method of claim 15, wherein if a number of rays in the target light field corresponds to "N", "N" being a positive integer, and a number of pixels included in the plurality of layers corresponds to "M", "M" being a positive integer, the projection matrix is provided in a size of "N×M".

18. The method of claim 15, wherein the modulating includes controlling a polarization rotation of light clockwise and counter-clockwise of at least one of the plurality of layers.

19. The method of claim 15, wherein the modulating further includes controlling an attenuation of light in the direction in which brightness of the transmitted light increases and in the direction in which brightness of the transmitted light decreases.

20. A non-transitory computer-readable medium comprising computer-readable instructions for instructing a computer to perform the method of claim 15.

* * * * *